United States Patent
Thøgersen et al.

(10) Patent No.: US 10,605,233 B2
(45) Date of Patent: Mar. 31, 2020

(54) METHOD OF MEASURING LOAD ON A WIND TURBINE

(71) Applicant: VESTAS WIND SYSTEMS A/S, Aarhus N (DK)

(72) Inventors: Morten Thøgersen, Hinnerup (DK); Fabio Caponetti, Aarhus C (DK); Dan Hilton, Gjern (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 146 days.

(21) Appl. No.: 15/738,171

(22) PCT Filed: Jun. 23, 2016

(86) PCT No.: PCT/DK2016/050220
§ 371 (c)(1),
(2) Date: Dec. 20, 2017

(87) PCT Pub. No.: WO2017/000960
PCT Pub. Date: Jan. 5, 2017

(65) Prior Publication Data
US 2018/0180030 A1    Jun. 28, 2018

(30) Foreign Application Priority Data
Jun. 30, 2015  (DK) .................................. 2015 70417

(51) Int. Cl.
*G01L 5/12*   (2006.01)
*F03D 17/00*  (2016.01)
(Continued)

(52) U.S. Cl.
CPC .............. *F03D 17/00* (2016.05); *F03D 1/06* (2013.01); *G01L 5/12* (2013.01); *F05B 2240/21* (2013.01);
(Continued)

(58) Field of Classification Search
CPC ... F03D 17/00; F03D 1/06; G01L 5/12; F05B 2260/83; F05B 2240/21; F05B 2260/84;
(Continued)

(56) References Cited

U.S. PATENT DOCUMENTS 9,032,807 B2 * 5/2015 Olesen ................... G01L 1/005
                                                              416/1
9,316,571 B2 * 4/2016 Muller .................. G01P 15/093
(Continued)

FOREIGN PATENT DOCUMENTS

AU    2009340218 A1    11/2010
CN    101719190 A      6/2010
(Continued)

OTHER PUBLICATIONS

PCT International Search Report for Application No. PCT/DK2016/050220 dated Jun. 23, 2016.
(Continued)

*Primary Examiner* — Freddie Kirkland, III
(74) *Attorney, Agent, or Firm* — Patterson + Sheridan, LLP

(57) ABSTRACT

A method of measuring load on a wind turbine, and a wind turbine for such load measuring, are disclosed. The wind turbine comprises at least one rotor blade and at least one load sensor associated with the rotor blade. At least one load sensor is located at a position on the rotor blade remote from both a flap bending moment axis and an edge bending moment axis of the rotor blade. At the position, a flap bending moment component and an edge bending moment component of the load on the rotor blade are measurable. A load value is measured from the load sensor, and the measured load value is used to determine a flap bending moment component of the load and an edge bending
(Continued)

moment component of the load, and optionally or additionally an axial force component of the load.

18 Claims, 4 Drawing Sheets

(51) Int. Cl.
*F03D 1/06* (2006.01)
*G01M 15/14* (2006.01)

(52) U.S. Cl.
CPC ....... *F05B 2260/80* (2013.01); *F05B 2260/83* (2013.01); *F05B 2260/84* (2013.01); *F05B 2270/331* (2013.01); *F05B 2270/807* (2013.01); *F05B 2270/808* (2013.01); *G01M 15/14* (2013.01); *Y02E 10/721* (2013.01)

(58) Field of Classification Search
CPC ............ F05B 2260/80; F05B 2270/808; F05B 2270/331; F05B 2270/807; G01M 15/14; Y02E 10/721
See application file for complete search history.

(56) References Cited

U.S. PATENT DOCUMENTS

| | | | | |
|---|---|---|---|---|
| 9,353,727 | B2* | 5/2016 | Slot | F03D 1/065 |
| 9,523,354 | B2* | 12/2016 | Olesen | F03D 80/40 |
| 9,970,413 | B2* | 5/2018 | Zaib | F03D 7/0224 |
| 2009/0246019 | A1* | 10/2009 | Volanthen | F03D 80/40 416/1 |
| 2010/0101335 | A1 | 4/2010 | Volanthen et al. | |
| 2012/0292905 | A1* | 11/2012 | Slot | F03D 1/065 290/44 |
| 2013/0174664 | A1* | 7/2013 | Olesen | G01L 1/005 73/763 |
| 2013/0177417 | A1* | 7/2013 | Olesen | F03D 80/40 416/1 |
| 2015/0211969 | A1* | 7/2015 | Muller | G01P 15/093 73/849 |
| 2018/0180029 | A1* | 6/2018 | Caponetti | F03D 17/00 |

FOREIGN PATENT DOCUMENTS

| | | |
|---|---|---|
| CN | 104074687 A | 10/2014 |
| CN | 104641107 A | 5/2015 |
| DE | 102012108776 A1 | 3/2014 |
| EP | 2112375 A2 | 10/2009 |
| EP | 2354538 A1 | 8/2011 |
| EP | 2531722 A1 | 12/2012 |
| EP | 2615303 A1 | 7/2013 |
| WO | 2012089545 A1 | 7/2012 |
| WO | 2017000960 A1 | 1/2017 |

OTHER PUBLICATIONS

Danish Patent and Trademark Office Search Report for Application No. PA 2015 70417 dated 14, 2016.
PCT Written Opinion of the International Searching Authority for Application No. PCT/DK2016/050220 dated Jun. 23, 2016.

* cited by examiner

METHOD OF MEASURING LOAD ON A WIND TURBINE

FIELD OF THE INVENTION

This invention is directed to a method of measuring load on a wind turbine, and a wind turbine for such load measuring.

BACKGROUND OF THE INVENTION

Loading on the components of wind turbines is carefully controlled, in order to maximise efficiency, and to minimise wear and damage. Load sensors are commonly mounted on wind turbines, typically on the rotor blades. These sensors are required to provide precise measurements of the loads on the turbine, and the sensors also require regular calibration in order to determine and track any offset between the values measured by the sensors, and the actual loads on the turbine components.

In one previously considered system for measuring loads on a wind turbine, there is a single sensor on each rotor blade. It measures the bending moment in only the "flap" or "flapwise" direction.

In another previous system there are four sensors that can measure bending moments in both the flapwise and edgewise directions. The sensors are mounted in the root of the blade and are aligned with the principle bending moment axes, "flap" and "edge", as shown in FIG. 3, a cross section at the root of a rotor blade assembly. The rotor blade assembly (300) has an outboard blade section, indicated by dotted lines 304, and a blade root, having a circumference 302. The four sensors (306) are mounted on the circumference of the blade root. A first pair of the sensors are mounted in alignment with and at opposite ends of the edge bending moment axis (308), the axis through the front and rear edges of the blade. The second pair are mounted in alignment with and at opposite ends of the flap axis (310), orthogonal to the edge axis.

Having two sensors per axis allows differential measuring which is used to cancel out the axial forces (i.e. gravity and centrifugal) and provide a purer bending moment.

Blade designs have created problems with mounting the sensors along the principal axes (for example, structural shell blades with an internal web). There may also be other hardware, or the typical lightning conductor obstructing the alignment of the sensors. Previous implementations for calibration and operation of the blade load sensors have required that the sensors be placed along the principle bending moment axes, in order to provide accurate measurement and calibration. They have therefore incorporated inaccuracies, and are not sufficiently flexible regarding future development. They can also be expensive, due to the number of sensors required, and the complexity of installation and servicing.

Other previous systems have used pairs of sensors in different positions, such as one each on the edge and flap axes, or a pair aligned with one axis with a single sensor on the other. These nevertheless require the sensors to be aligned with the principle axes, or at least paired in parallel to an axis, as they are resolving forces separately in either the edgewise, or the flapwise direction.

The present invention aims to address these problems and provide improvements upon the known devices and methods.

STATEMENT OF INVENTION

Aspects and embodiments of the invention are set out in the accompanying claims.

In general terms, one embodiment of a first aspect of the invention can provide a method of measuring load on a wind turbine, the wind turbine comprising at least one rotor blade and at least one load sensor associated with the rotor blade, wherein the at least one load sensor is located at a position on the rotor blade remote from both a flap bending moment axis and an edge bending moment axis of the rotor blade, whereat a flap bending moment component and an edge bending moment component of the load on the rotor blade are measurable, the method comprising: measuring a load value from the load sensor; and using the measured load value to determine: a flap bending moment component of the load; and an edge bending moment component of the load.

The measurement of both flap and edge components using the same sensor allows the use of sensors which are off-axis, which do not require alignment with one of the edge or flap axes. The sensor may be in an outlying position from the axis/axes, or significantly or substantially off-axis, or not aligned with one or other axis. The sensor may also not be part of a differential pair of sensors.

The sensor(s) being off-axis means that turbine systems can be more tolerant to sensor placement, as the sensors can be placed around obstacles obscuring alignment with the axes. This in turn reduces service visits to re-install sensors. Fewer competing/obstructing components can also lead to longer component and sensor lifetimes.

The flap and edge components of the load being measurable may mean that they are estimable or significant enough to be measurable/measured. The flap and edge components of the load may be comparable in magnitude, which may mean that they are of a magnitude that is able to be compared, or practicable to compare, or significant enough to compare. For example, the components may be of a similar order of magnitude. The distance off-axis will determine the magnitude of the secondary or lesser of the two components at the given position. The position of the sensor off-axis may be defined by a minimum load in the secondary direction or axis.

In embodiments, the step of using the measured load value comprises using the load value from only that sensor to determine both the flap and edge bending moment components, or one estimate (using that sensor only) of both components.

Suitably, the at least one load sensor is located at a position on the rotor blade at a minimum radial angle from an intersection of the flap bending moment axis and the edge bending moment axis of the rotor blade. For example, the angle subtended by a line drawn from the sensor to the intersection of the axes may be a minimum angle, for example 10 degrees.

In embodiments, the step of using the measured load value comprises using the measured load value to determine an axial component of the load on the rotor blade. Therefore the axial, edge and flap components are all determined using the load value from the (single) sensor.

Optionally, the wind turbine comprises at least three load sensors associated with the rotor blade. Since each sensor provides measurement of (at least) the edge and flap components, there is no longer any need for four sensors to be used, and in an embodiment only three load sensors are required for calculation of the components. This provides a cost and complexity reduction, by removing the typical fourth sensor.

In other embodiments, there may be five or more sensors for each rotor blade. Whilst this may not provide additional economy, five or more off-axis sensors may provide more accurate results, or additional sensing options.

In an embodiment, the method comprises: measuring a load value from each of the at least three load sensors; and using the measured load values from all of the at least three load sensors to calculate a load for the at least one rotor blade.

This and other embodiments described later in detail provide much improved sensor calibration and system accuracy, and product optimisation, by using three off-axis sensors, using the load values from each to provide at least the flap and edge components of the load, and using all this data to calculate the load estimate. For example, having the three sources of information allows solving for three unknowns in the models described.

Suitably, the at least three load sensors are located at equidistant positions around a periphery of the rotor blade. Alternatively, the sensors could be at any point around the periphery, with no particular regular spacing, though at least one being off-axis. In embodiments, the sensors will be in the same plane, for example a plane occupying a section through the root of the blade, orthogonal to the axis of the blade. In embodiments, the at least one sensor is located at a blade root of the rotor blade. The located periphery of the blade may be a circumference of the blade root. The sensor(s) may also or alternatively be disposed along the length of the rotor blade.

One embodiment of a second aspect of the invention can provide a method of measuring load on a wind turbine, the wind turbine comprising at least one rotor blade and at least three load sensors associated with the rotor blade, wherein the at least three load sensors are located at positions on the rotor blade remote from both a flap bending moment axis and an edge bending moment axis, the method comprising: measuring load values from the load sensors; and for each of the at least three load sensors, using the measured load value to determine axial force, flap bending moment and edge bending moment components of the load on the rotor blade.

This use of multi-component data from all three sensors to calculate the estimate provides improved calibration and system accuracy.

Suitably, the method further comprises estimating at least one of: the flap bending moment component of the load; the edge bending moment component of the load; and an axial force component of the load.

Thus in embodiments in which only one or two sensors on the rotor blade are available, it may be necessary or appropriate to estimate at least one of these three factors, as measured values from the one or two sensors may not satisfactorily complete the load calculation. For example if there are three unknowns in the load calculation model, and two sensors provide two measurement inputs, an estimate may be used for the third unknown.

One embodiment of a third aspect of the invention can provide a computer program, or a computer readable medium comprising computer program code, adapted, when loaded into or run on a computer or processor, to cause the computer or processor to carry out steps of a method according to any of the above described aspects and embodiments.

One embodiment of a fourth aspect of the invention can provide a wind turbine comprising: at least one rotor blade; at least one load sensor associated with the rotor blades, wherein the at least one load sensor is located at a position on the rotor blade remote from both a flap bending moment axis and an edge bending moment axis of the rotor blade, whereat a flap bending moment component and an edge bending moment component of the load on the rotor blade are measurable; and a controller configured to: measure a load value from the load sensor; and use the measured load value to determine: a flap bending moment component of the load; and an edge bending moment component of the load.

Optionally, the at least one load sensor is located at a position on the rotor blade at a minimum radial angle from an intersection of the flap bending moment axis and the edge bending moment axis of the rotor blade. Suitably, the wind turbine comprises at least three load sensors associated with the rotor blade.

Optionally, the at least three load sensors are located at equidistant positions around a periphery of the rotor blade.

One embodiment of a fifth aspect of the invention can provide a method of measuring load on a wind turbine, the wind turbine comprising at least one rotor blade and at least one load sensor associated with the rotor blade, wherein the at least one load sensor is located at a position on the blade not on a flap bending moment axis or an edge bending moment axis, the method comprising:
measuring a load value from the load sensor; and using the measured load value to determine: a flap bending moment component of the load on the rotor blade; and an edge bending moment component of the load.

One embodiment of a sixth aspect of the invention can provide a method of measuring load on a wind turbine, the wind turbine comprising at least one rotor blade and at least one load sensor associated with the rotor blade, wherein the at least one load sensor is located at a position on the rotor blade remote from both a flap bending moment axis and an edge bending moment axis of the rotor blade, the method comprising: measuring a load value from the load sensor; and using the measured load value to determine at least two of: a flap bending moment component of the load; an edge bending moment component of the load; and an axial force component of the load.

The above aspects and embodiments may be combined to provide further aspects and embodiments of the invention.

BRIEF DESCRIPTION OF THE DRAWINGS

The invention will now be described by way of example with reference to the accompanying drawings, in which.

DETAILED DESCRIPTION OF EMBODIMENTS

Embodiments of this invention include the use of one or more blade load sensors mounted anywhere along the blade while not being restricted to being aligned with the principle axes of the blade. Embodiments of this invention focus on the application of three sensors positioned 'off-axis'.

The embodiments described provide solutions allowing sensors (one or more) to be positioned anywhere around the inside of the blade. Three sensor solutions can provide both flap and edge bending moments and axial force.

These embodiments solve the problem with mounting sensors off the principle axes as well as removing a redundant sensor (only three sensors are needed instead of four). The mathematical model associated with these embodiments also improves the calibration and operation of existing systems that use one and four sensors. In addition, with some blade designs, the optimal sensor location may in any case not be along the principle axes—embodiments of the invention allow/provide this.

The inventors have recognised that there are three significant factors which influence the strain measurement; the flap bending moment, the edge bending moment and the axial force component of the load on the rotor blade. In previously considered arrangements, if a sensor were placed precisely on the flap axis the load calculation might assume that the edge component (and vice versa) can be ignored. For the remaining axial component, pairs of sensors have been used to try to cancel out this factor.

Embodiments of the invention instead use a (generic) model of the load that uses all three components (rather than assuming one is zero, or cancelling one out). There is hence no longer a concern over the position of the sensors on an axis, in order to perform such zero-ing or pair-cancellation. In embodiments, the invention uses a load calculation model using all three components, having three unknowns, which can in an embodiment be solved using values from (at least) three sensors, at any positions spaced around the blade. In alternatives, an estimate may be used for one or two of the three factors, so that only two or one sensors are used.

Figure 1:
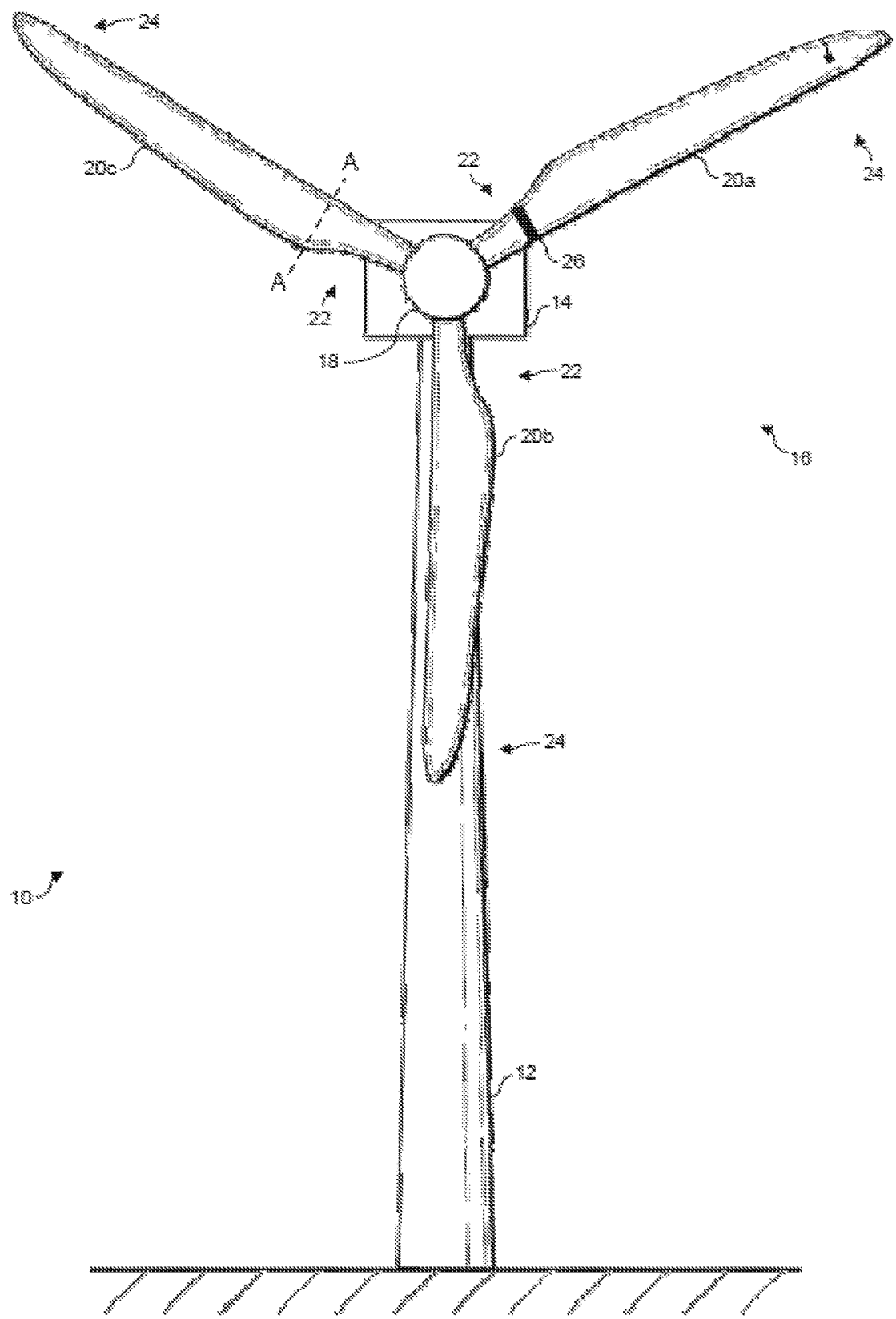
FIG. 1 is a schematic view of a wind turbine according to an embodiment of the present invention.

FIG. 1 is a schematic view of a wind turbine according to an embodiment of the present invention. A wind turbine 10 comprises a tower 12 on which a nacelle 14 is supported. A rotor 16 is mounted to the front of the nacelle 14. The rotor 16 comprises a hub 18 on which three equally-spaced rotor blades 20a, 20b, 20c are mounted. The rotor 16 includes a blade pitch system capable of varying the pitch angle of each rotor blade 20a, 20b, 20c independently, for example using an electric or hydraulic blade pitch drive.

The rotor blades 20a, 20b, 20c comprise an outer shell defining a substantially hollow interior. The blades each have a substantially solid tip region, which comprises the outermost 1-2 metres of the blade. The outer shell is primarily constructed of glass fibre reinforced composite materials. The rotor blades 20a, 20b, 20c each have a substantially cylindrical cross section at their root end 22. The cross section smoothly transitions to an aerofoil profile at a maximum chord position as indicated by the line A-A. The chord then progressively decreases towards the tip 24 of the rotor blades 20a, 20b, 20c. The rotor blades 20a, 20b, 20c also steadily taper in thickness along their length moving from the root 22 towards the tip 24.

A load sensing system 26 is located near a root end 22 of the rotor blade 20a.

Figure 2:
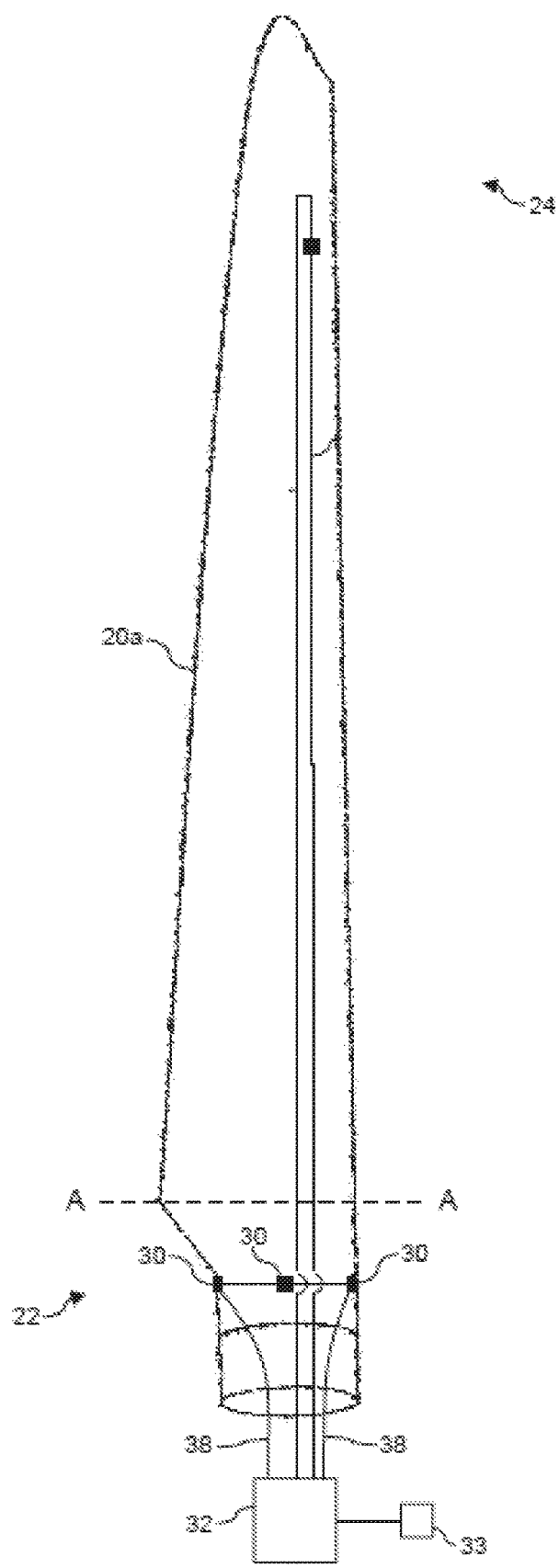
FIG. 2 is a schematic view of a rotor blade of the wind turbine shown in FIG. 1.

FIG. 2 is a schematic view of a rotor blade of the wind turbine shown in FIG. 1, which shows the rotor blade 20a in more detail. The load sensing system 26 comprises one or more load sensors 30. The load sensors 30 are spaced circumferentially around the root end 24 of the rotor blade 20a, and are mounted on the inner surface of the rotor blade shell to protect them from the environment. In other embodiments, the load sensors 30 may be mounted on the outer surface of the shell or embedded within the shell.

In alternative embodiments, the load sensor(s) may be mounted in a different position on the rotor blade away from the root, for example along the length of the blade. The position is typically chosen to measure the mechanical deformation at that part of the blade. Sensors may of course be mounted in both, or more, positions.

The load sensors 30 are configured to measure the mechanical deformation of the root end of the blade. In this embodiment, the load sensors 30 are optical strain gauges such as fibre Bragg gratings comprising equally spaced reflection points in the core of the optical fibre that reflect different wavelengths of light under different levels of strain. Other conventional types of load sensors and strain gauges may also be used.

As wind turbines are very tall structures, they are susceptible to lightning strikes that may cause damage to the wind turbine 10. The use of optical load sensors eliminates metallic or electrically conductive components in exposed parts of the rotor, thereby reducing the vulnerability of the rotor blade 20a to lightning strikes.

An optoelectronic suite 32 is located remote from the rotor blade 20a, for example in the nacelle 14 or the hub 18 of the wind turbine 10. The optoelectronic suite 32 and the blade pitching system of the wind turbine are connected to a controller 33.

The load sensors 30 are connected in series with the optoelectronic suite 32 by optical fibres 38 as is conventional in the art. The optoelectronic suite 32 further comprises a light source connected to the load sensor, or the first load sensor in the series, and a light detector connected to the load sensor, or the last load sensor in the series.

The controller 33 includes a memory on which control software is stored, and a processor to run the control software. The control software governs the operation of the load sensors 30 and blade pitching system. As will be described in more detail later, the control software controls, for example, measuring a load value from the load sensor; and using the measured load value to determine: a flap bending moment component of the load; and an edge bending moment component of the load; and an axial force component of the load.

A mathematical model and calibration method have been developed allowing the use and calibration of both single and multiple sensor systems with the same turbine software. The model is more generic than in previously considered methods and includes more degrees of freedom. It treats the sensors independently which enables a solution with one, two, three, four (or more) sensors, though three is all that is necessary for the particular embodiment described with reference to FIG. 4. By treating the sensors independently, they can be placed anywhere along the circumference of the blade as shown in FIG. 4.

Figure 3:
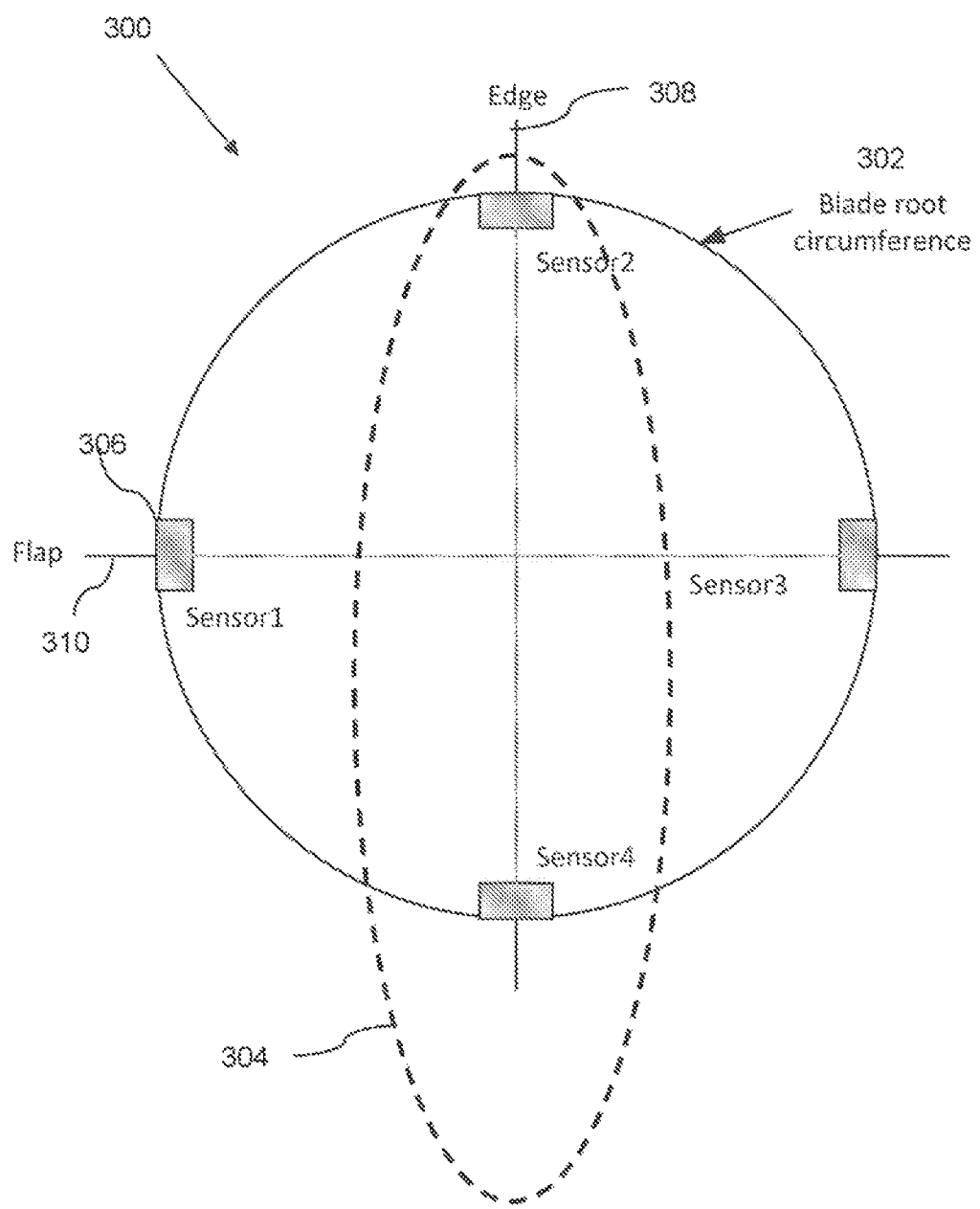
FIG. 3 is a diagram illustrating a cross section of a turbine rotor blade according to a previously considered system.
Figure 4:
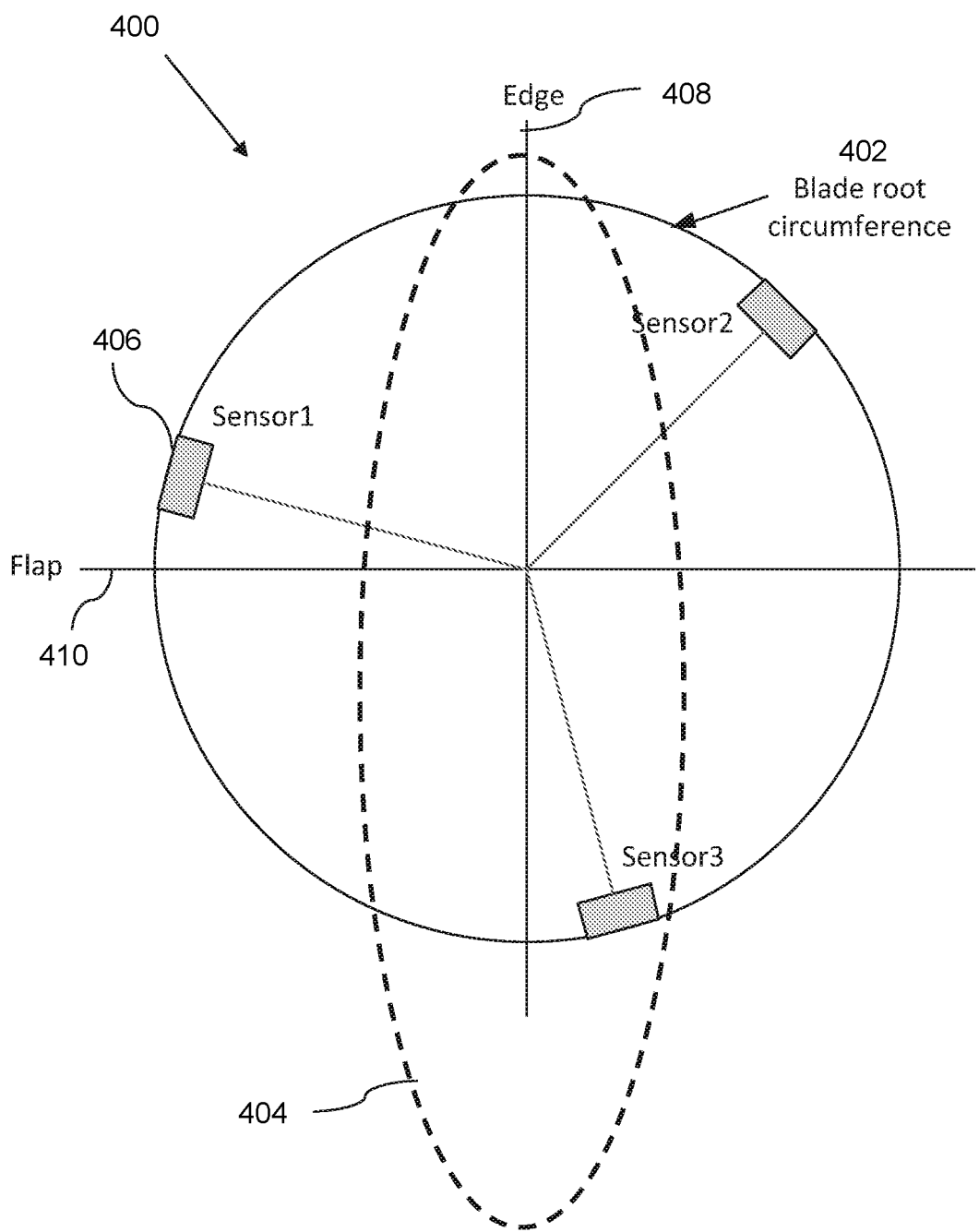
FIG. 4 is a diagram illustrating a cross section of a turbine rotor blade according to an embodiment of the invention.

FIG. 4 is a diagram illustrating a cross section of a turbine rotor blade according to an embodiment of the invention. Many components are similar to those illustrated in FIG. 3. The rotor blade assembly 400 again has an outboard rotor blade section, the cross section of which is indicated by the dotted lines 404. This cross section in FIG. 4 is taken at the blade root, having a circumference 402. The sensors 406 are again mounted on the circumference of the blade root. However, here there are only three load sensors, rather than four. Moreover, in this case all of the sensors are mounted at positions which do not align with either the edge bending moment axis 408, the axis through the front and rear edges of the blade or the flap axis 410, orthogonal to the edge axis. The sensors are each at least a minimum distance or radial angle away from a position in alignment with one or other axis. Practically speaking this means that they avoid obstacles which may be present in those areas which would affect positioning and installation. Functionally, this means that the sensors can measure at least a minimum of the other bending moment component, so that each sensor can be used (at least) for both flap and edge moment load data. For example, Sensor 1 in FIG. 4 (406) is mounted near, but not in alignment with, the flap axis (410). This means that most of the gain for this sensor will be in the flap direction, but there will however also be a component in the edge direction.

The sensors are therefore no longer specifically "flap" or "edge" sensors or treated as a differential pair. Each sensor is simply considered to be a strain sensor that measures the total strain that comes from axial forces and bending moments, as described below.

The sensors in FIG. 4 are equidistant around the circumference of the blade root. However, this need not be the case; in other embodiments the sensors are placed off-axis, but irregularly—similar methods can nevertheless be used to combine their outputs and find the load components. Similarly, the sensors may not all be required to be off-axis—if at least two are off-axis, a third may be aligned, though this may require an estimate to be made of a third load component (see below re. fewer sensors). In embodiments, it may be necessary that the sensors are not placed too close to each other, i.e. that they are spread around the blade circumference to ensure a good mathematical solution. If two sensors are placed next to each other, they may effectively become one for the purposes of the load calculation model, and the solution may therefore be highly sensitive and less accurate.

It should be noted that there may also be a torsional or "twisting" component, but for sensors mounted along the blade direction, the torsional component should be negligible.

The strain sensor model is based on the following equations:

$$\text{Strain} = K_{Sensor}\text{Sensor} + O_{Sensor}$$

$$\text{Strain} = K_{Axial}F_{Axial} + K_{Flap}M_{Flap} + K_{Edge}M_{Edge}$$

where: K_Sensor is a conversion factor from load sensor value to strain (known); O_Sensor is the sensor offset; F_Axial is the axial force caused by gravity and blade rotation (centrifugal/centripetal force); M_Flap is the flap bending moment; M_Edge is the edge bending moment; K_Axial is the blade stiffness "gain" in the axial direction; K_Flap is the blade stiffness gain in the flap direction; and K_Edge is the blade stiffness gain in the edge direction.

The sensors are calibrated separately and then combined to calculate the loads. The number of sensors installed typically dictates what kinds of loads can be calculated. The sensors are calibrated using a blade loads estimator that provides the estimated axial force and flap/edge bending moments. Using estimation theory, the unknown state variables are solved by finding a minimum error solution.

During calibration:

$$K_{Sensor}\text{Sensor} = K_{Axial}F_{Axial,Estimated} + K_{Flap}M_{Flap,Estimated} + K_{Edge}M_{Edge,Estimated} - O_{Sensor}$$

$$K_{Sensor}\text{Sensor} = [F_{Axial,Estimated}\ M_{Flap,Estimated}\ M_{Edge,Estimated}\ -1] \begin{bmatrix} K_{Axial} \\ K_{Flap} \\ K_{Edge} \\ O_{Sensor} \end{bmatrix}$$

Calibration of the sensors is outside the scope of this patent application and so will not be described further here. However, for completeness, it should be noted that the skilled person will be aware that standard calibration techniques may be used to calibrate the sensors.

In systems having sensors on the principle axes, the "flap" sensors should have a low edge gain and the "edge" sensors should have a low flap gain. In theory, a flap sensor would have zero edge gain, but due to sensor misalignment, there is usually some "cross-coupling" in such systems, which leads to inaccuracy if "cross-coupling" is ignored.

Using a generic sensor model that includes both flap and edge gains allows the sensors to be placed off-axis, and calibration will find the appropriate gains according to their location. The loads can be calculated by combining or "fusing" the load data from the three (or more) sensors. First the strains are calculated by the equation previously defined above. Then, for calculation of loads with three or more sensors, these are given by:

$$\begin{bmatrix} F_{Axial} \\ M_{Flap} \\ M_{Edge} \end{bmatrix} = \begin{bmatrix} K_{Axial,1} & K_{Flap,1} & K_{Edge,1} \\ K_{Axial,2} & K_{Flap,2} & K_{Edge,2} \\ K_{Axial,3} & K_{Flap,3} & K_{Edge,3} \\ \ldots & \ldots & \ldots \end{bmatrix} \begin{bmatrix} \text{Strain}_1 \\ \text{Strain}_2 \\ \text{Strain}_3 \\ \ldots \end{bmatrix}$$

The method of embodiments of the invention also therefore differs from some methods in that the calculation is in two stages. First, the raw load sensor data is used to find the strain values, using the calibration. Second, the strain values are used to calculate the axial forces and the bending moment components, as in the equation above.

As can be seen from the above equations, if there are systems in which fewer than three sensors are preferred, or only fewer than three are possible, the same system and methods can be used to find certain components and not others, which would then have to be estimated otherwise. For example, in a system with two sensors, the strain values could be used to find the flap and edge moments, and an estimate of the axial components could be made by other means, or axial components could be ignored, or valued according to a fixed rate or tabulated method.

It will be appreciated by those skilled in the art that the invention has been described by way of example only, and that a variety of alternative approaches may be adopted without departing from the scope of the invention, as defined by the appended claims.

The invention claimed is:

1. A method of measuring a load on a rotor blade of a wind turbine, the method comprising:
    measuring a load value from a load sensor that is located at a position on the rotor blade remote from both a flap bending moment axis and an edge bending moment axis of the rotor blade; and
    using at least the measured load value and a blade stiffness gain, determining:
        a flap bending moment component of the load; and
        an edge bending moment component of the load.

2. The method according to claim 1, wherein the load sensor is located at a position on the rotor blade at a minimum radial angle from an intersection of the flap bending moment axis and the edge bending moment axis.

3. The method according to claim 1, further comprising:
    using at least the measured load value and the blade stiffness gain, determining an axial component of the load.

4. The method of claim 3, wherein the load sensor is one of at least three load sensors associated with the rotor blade, the method further comprising:
    calibrating each of the at least three load sensors, wherein calibrating each of the at least three load sensors comprises:

using a blade loads estimator, estimating a flap bending moment, an edge bending moment, and an axial force; and determining the blade stiffness gain using the estimated flap bending moment, the estimated edge bending moment, and the estimated axial force.

5. The method according to claim 1, wherein the load sensor is one of at least three load sensors associated with the rotor blade.

6. The method according to claim 5, the method comprising:
measuring load values from each of the at least three load sensors; and
calculating the load using the measured load values.

7. The method according to claim 5, wherein the at least three load sensors are located at equidistant positions around a periphery of the rotor blade.

8. The method according to claim 1, wherein the load sensor is located at a blade root of the rotor blade.

9. The method of claim 1, further comprising:
calibrating the load sensor using a blade loads estimator, wherein calibrating the load sensor comprises:
estimating at least a flap bending moment and an edge bending moment; and
determining the blade stiffness gain using at least the estimated flap bending moment and the estimated edge bending moment.

10. A method of measuring a load on a rotor blade of a wind turbine, the method comprising:
measuring load values from at least three load sensors that are located at positions on the rotor blade remote from both a flap bending moment axis and an edge bending moment axis of the rotor blade;
for each of the at least three load sensors, using at least the measured load values to determine a respective axial force component, a respective flap bending moment component, and a respective edge bending moment component of the load; and
determining an axial force, a flap bending moment, and an edge bending moment of the load using the respective axial force components, the respective flap bending moment components, and the respective edge bending moment components.

11. The method according to claim 1, further comprising:
estimating at least one of: the flap bending moment component of the load; the edge bending moment component of the load; and an axial force component of the load.

12. The method of claim 10, wherein the respective axial force component, the respective flap bending moment component, and the respective edge bending moment component of the load are determined using the measured load value and a blade stiffness gain.

13. The method of claim 12, further comprising:
calibrating the load sensor using a blade loads estimator, wherein calibrating the load sensor comprises:
estimating at least a flap bending moment and an edge bending moment; and
determining the blade stiffness gain using at least the estimated flap bending moment and the estimated edge bending moment.

14. A computer program product comprising:
a non-transitory computer readable medium comprising computer program code that, when loaded into or run on a computer or processor, causes the computer or processor to perform an operation of measuring a load on rotor blade of a wind turbine, the operation comprising:
measuring a load value from a load sensor that is located at a position on the rotor blade remote from both a flap bending moment axis and an edge bending moment axis of the rotor blade; and
using at least the measured load value and a blade stiffness pain, determining:
a flap bending moment component of the load; and
an edge bending moment component of the load.

15. A wind turbine comprising:
a rotor blade;
a load sensor located at a position on the rotor blade remote from both a flap bending moment axis and an edge bending moment axis of the rotor blade; and
a controller configured to:
measure a load value from the load sensor; and
using at least the measured load value and a blade stiffness gain, determine:
a flap bending moment component of the load; and
an edge bending moment component of the load.

16. The wind turbine according to claim 15, wherein the load sensor is located at a position on the rotor blade at a minimum radial angle from an intersection of the flap bending moment axis and the edge bending moment axis.

17. The wind turbine according to claim 15, wherein the load sensor is one of at least three load sensors associated with the rotor blade.

18. The wind turbine according to claim 17, wherein the at least three load sensors are located at equidistant positions around a periphery of the rotor blade.

* * * * *